United States Patent
Warren et al.

[19]

[11] Patent Number: 6,067,704

[45] Date of Patent: May 30, 2000

[54] APPARATUS FOR ASSEMBLING HEAT EXCHANGER CORES

[75] Inventors: Bobby G. Warren; Ronald J. Paternoster, Jr., both of Taylor, Mich.

[73] Assignee: Livernois Research and Development Company, Dearborn, Mich.

[21] Appl. No.: 08/873,417

[22] Filed: Jun. 12, 1997

[51] Int. Cl.[7] .................................................. B23P 15/00
[52] U.S. Cl. .............................. 29/727; 29/726; 29/33 G
[58] Field of Search .................................. 29/726, 726.5, 29/727, 33 G, 890.03

[56] References Cited

U.S. PATENT DOCUMENTS

| | | |
|---|---|---|
| 3,114,963 | 12/1963 | Kritzer . |
| 4,380,868 | 4/1983 | Hall ........................................ 29/33 G |
| 4,631,813 | 12/1986 | Daniels et al. .............................. 29/727 |
| 4,698,904 | 10/1987 | Nozawa et al. .......................... 29/33 G |
| 4,942,654 | 7/1990 | Wright et al. .............................. 29/446 |
| 5,206,990 | 5/1993 | Wright ...................................... 29/727 |
| 5,432,994 | 7/1995 | Tokura ...................................... 29/727 |
| 5,632,080 | 5/1997 | Harman et al. . |
| 5,752,312 | 5/1998 | Harman et al. .......................... 29/33 G |

FOREIGN PATENT DOCUMENTS

| | | | |
|---|---|---|---|
| 0068237 | 4/1982 | Japan ...................................... 29/33 G |

*Primary Examiner*—I Cuda
*Attorney, Agent, or Firm*—Brooks & Kushman P.C.

[57] ABSTRACT

A core builder machine (10), including an elongated table (12) on which the cores are supported and transferred to the various assembly portions of the machine (10). A plurality of heat exchanger tubes (18) are fed from a tube magazine (16) by a tube dispenser assembly (14) onto the table (12) where they are indexed and adapted to receive a plurality of serpentine fins (36) between a pair of adjacent tubes (18) to form an intermediate core assembly (42). The intermediate core assembly (42) is transferred downstream by a plurality of slides (56, 58) to a core compression section (70) where the intermediate core assembly (42) is compressed. After the intermediate assembly (42) is compressed the header attachment mechanism (75) moves into contact with the sides (56, 58) of the core to attach the headers and form a completed core assembly (110) that can be removed and then brazed.

24 Claims, 10 Drawing Sheets

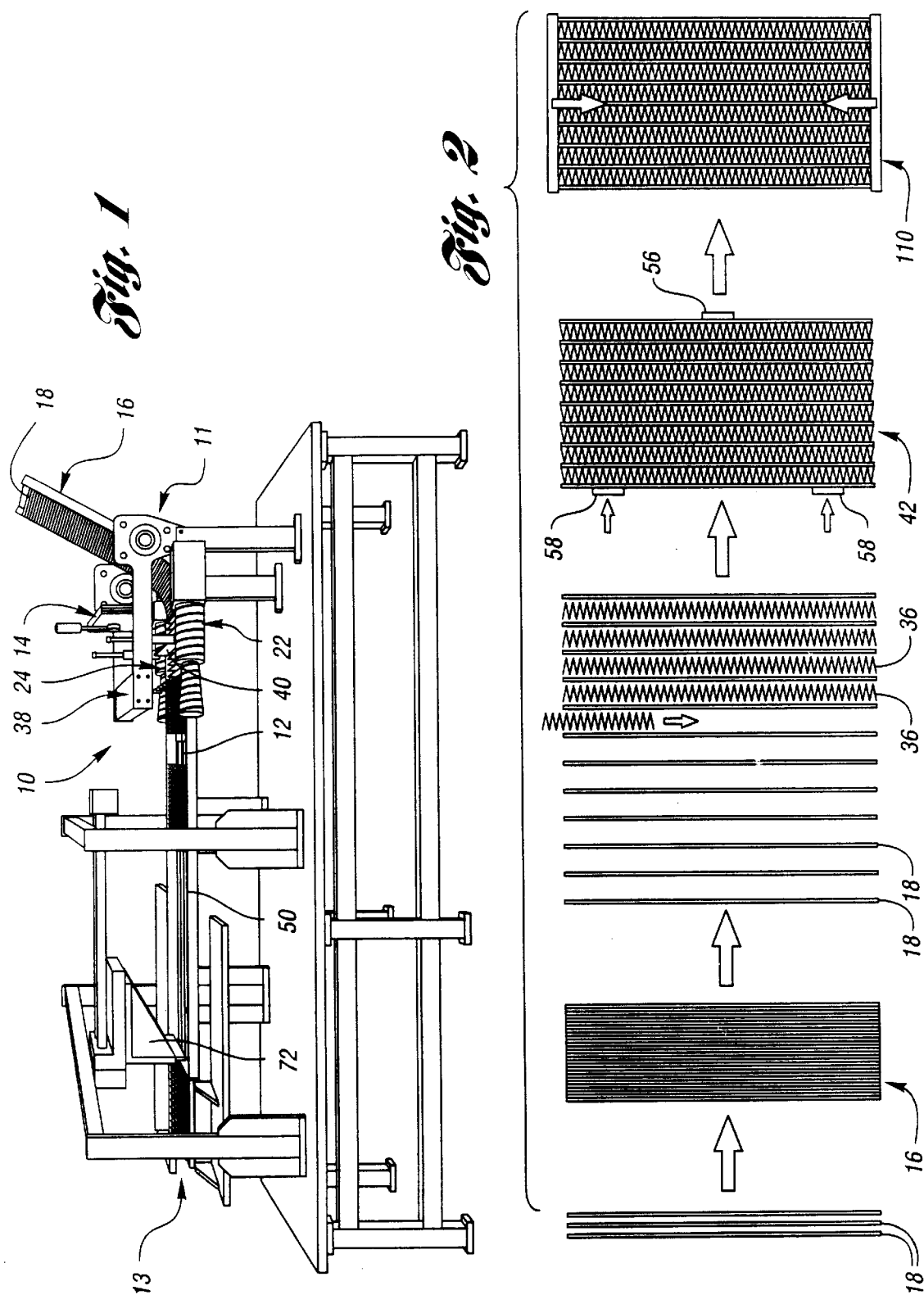

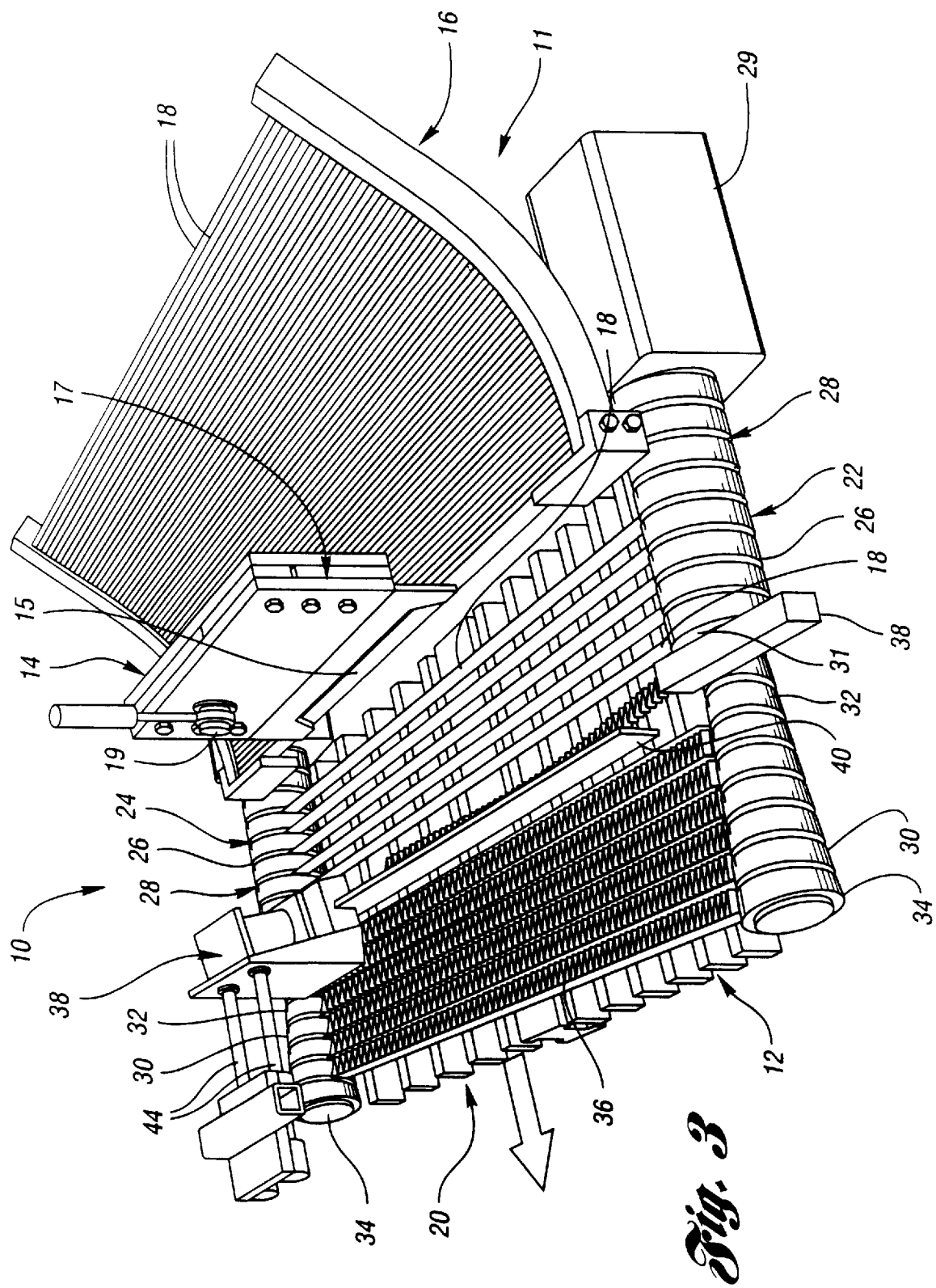

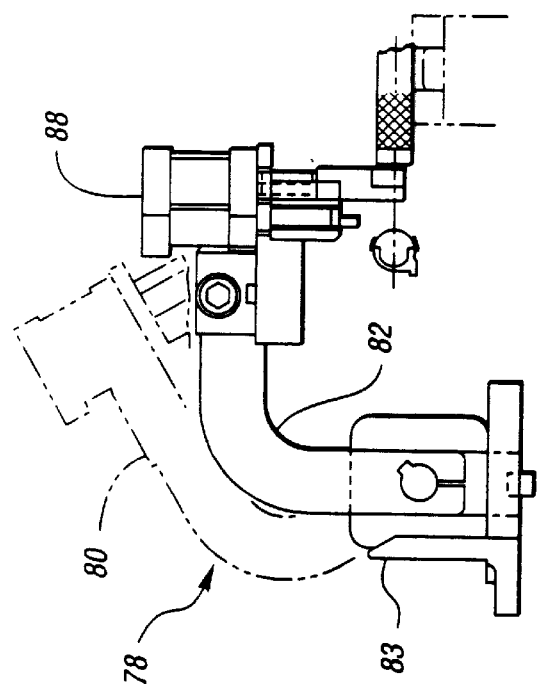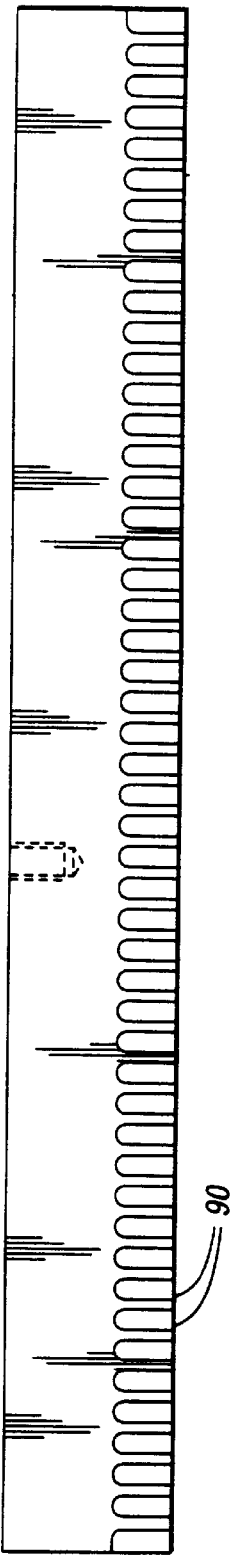

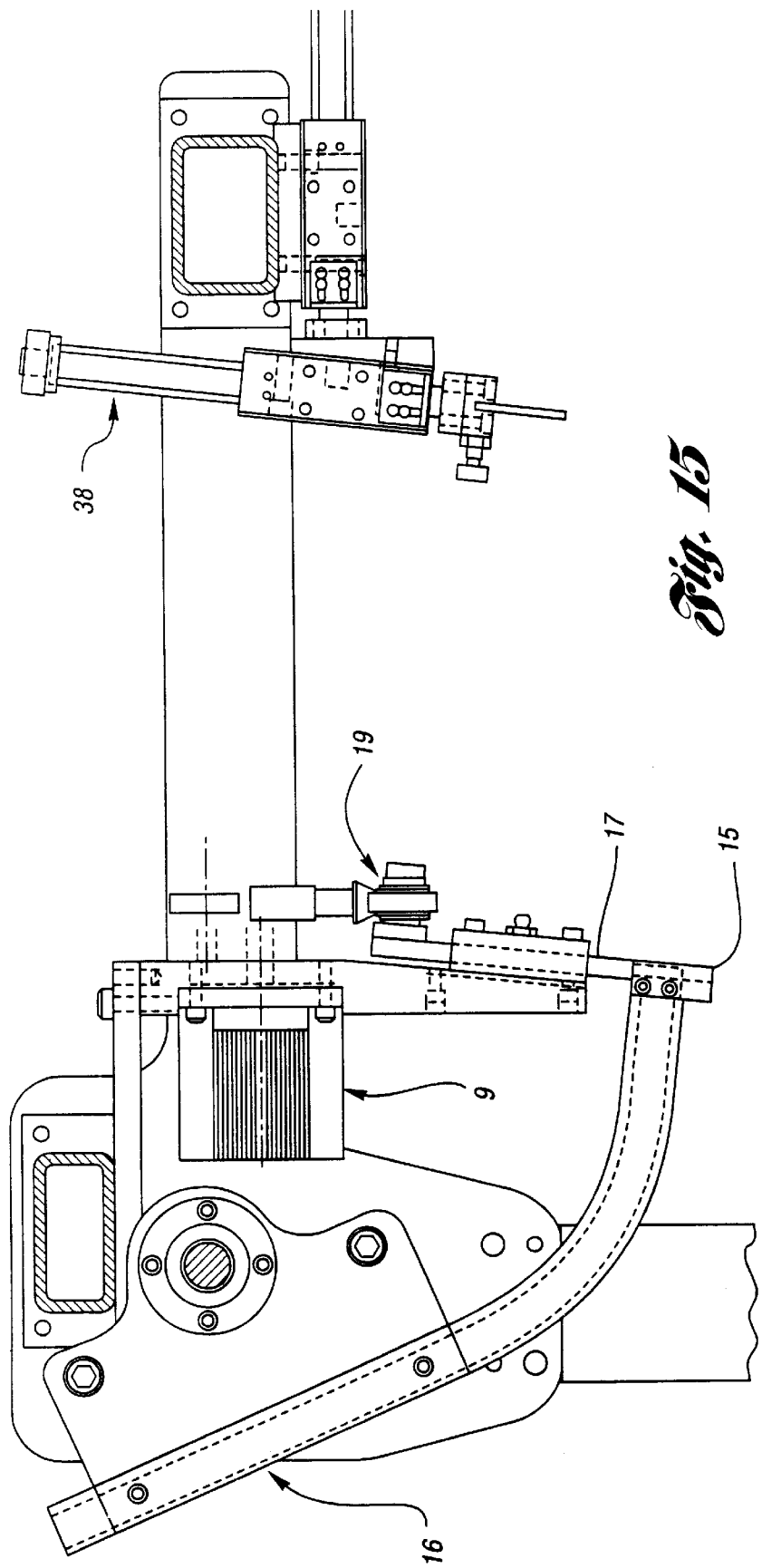

APPARATUS FOR ASSEMBLING HEAT EXCHANGER CORES

TECHNICAL FIELD

The present invention relates to a method and apparatus for assembling a heat exchanger core.

BACKGROUND ART

Prior apparatus for manufacturing heat exchanger cores have been primarily hydraulically operated. The use of hydraulic equipment requires a relatively large footprint in order for the machine to operate. Further, in order to conserve floor space with prior hydraulic machines, some of the hydraulics are placed above the assembling apparatus. This configuration does not allow for easy access to the machine for servicing or normal maintenance. Additionally, the operation and control of hydraulically operated machines is relatively inaccurate when compared to other control processes.

These prior apparatus and methods are not very flexible in that they do not allow for the easy manipulation of the machine to manufacture heat exchanger cores of various sizes. Thus, considerable down time is required to adjust the machine to handle different size heat exchanger cores. Further, these prior apparatus are relatively slow in that they are not able to load the tubes and fins used to assemble the heat exchanger cores onto the machine very quickly. For example, these prior apparatus can only manufacture about 40 to 45 cores per hour.

Thus, prior machines are bulky, relatively expensive and inaccurate, consume large areas of otherwise useable space, and leave much to be desired as throughput.

Additionally, most core builders have matrix types of assembly (alternating fin and tube). These core builders have difficulties dealing with the transition of one core to a successive core. For instance, the transfer mechanism does not always select the proper components required for the core and the mechanism sometimes damages the fins or tubes in the core.

SUMMARY OF THE INVENTION

It is an object of the present invention to provide a method and apparatus for assembling heat exchanger cores that provides increased flexibility by allowing the core builder machine to be easily adapted to accommodate various sized heat exchanger cores.

It is another object of the present invention to provide a method and apparatus for assembling heat exchanger cores that is faster in that it can assemble more heat exchanger cores in the same period of time as prior methods and apparatus.

It is a further object of the present invention to provide a method and apparatus for assembling heat exchanger cores that requires less equipment and less space than prior methods and apparatus.

The present invention provides an apparatus for manufacturing heat exchanger cores including an elongated table upon which the cores are manufactured and a magazine of tubes attached to one end of the elongated table. The table includes a tube indexing device disposed downstream of the magazine for receiving and transporting the tubes from the magazine along a predetermined length of the table so that the tubes are spaced apart from each other. A fin insertion mechanism is provided adjacent the table for inserting serpentine fins between adjacent ones of the spaced apart tubes during momentary cessation of the tube indexing device.

A fin compression device is included for compressing the fins, such that the pitch of the fins is uniformly distributed between the tubes to form an intermediate assembly. A transport mechanism transports the intermediate tube-fin assembly from the fin compression device to a core compressor located downstream on the elongated table. The core compressor compresses the intermediate assembly of tubes and fins received from the transport mechanism to form a compressed assembly. The compressed assembly is then acted upon by a comb and hold mechanism and then the header attachment mechanism which presses the headers onto the ends of the compressed assembly to form an assembled heat exchanger core. The assembled core is then removed either manually or automatically.

Additional features and advantages of the present invention will become apparent to one of skill in the art upon consideration of the following detailed description of the present invention.

BRIEF DESCRIPTION OF THE DRAWINGS

FIG. 1 is a perspective side view of a core builder machine in accordance with a preferred embodiment of the present invention;

FIG. 2 is a top plan view of the various states of the heat exchanger core formation in accordance with a preferred embodiment of the present invention;

FIG. 3 is a perspective view of the tube magazine and tube indexing device of the preferred core building machine in accordance with a preferred embodiment of the present invention;

FIG. 12 is an enlarged end view of the comb and hold down assembly of FIG. 11 and its operative and inoperative (phantom) positions;

FIG. 13 depicts a fin comb of the comb and hold down portion of FIG. 12;

FIG. 14 depicts a tube guide of the comb and hold down portion of FIG. 12;

FIG. 15 is a side view of a tube dispenser assembly in accordance with the present invention;

BEST MODE FOR CARRYING OUT THE INVENTION

Figure 6:
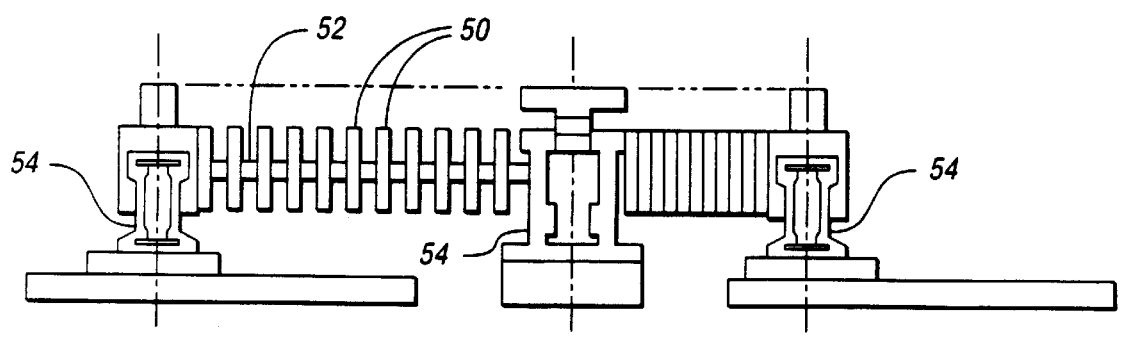
FIG. 6 is a cross-sectional end view of the elongated table of the core building machine showing the left-hand side in an uncompressed position and the right-hand side in a compressed position.
Figure 7:
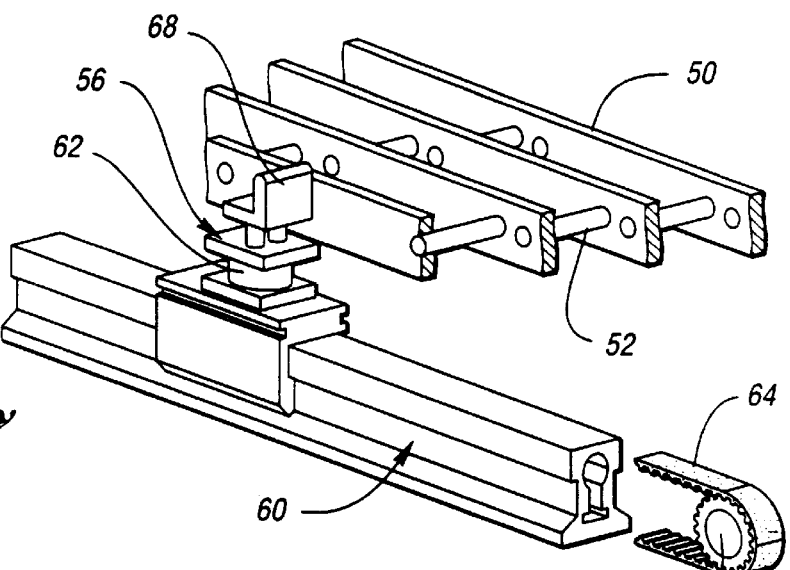
FIG. 7 is a perspective view of a portion of a slide mechanism in a raised position to contact an intermediate core assembly.
Figure 8:
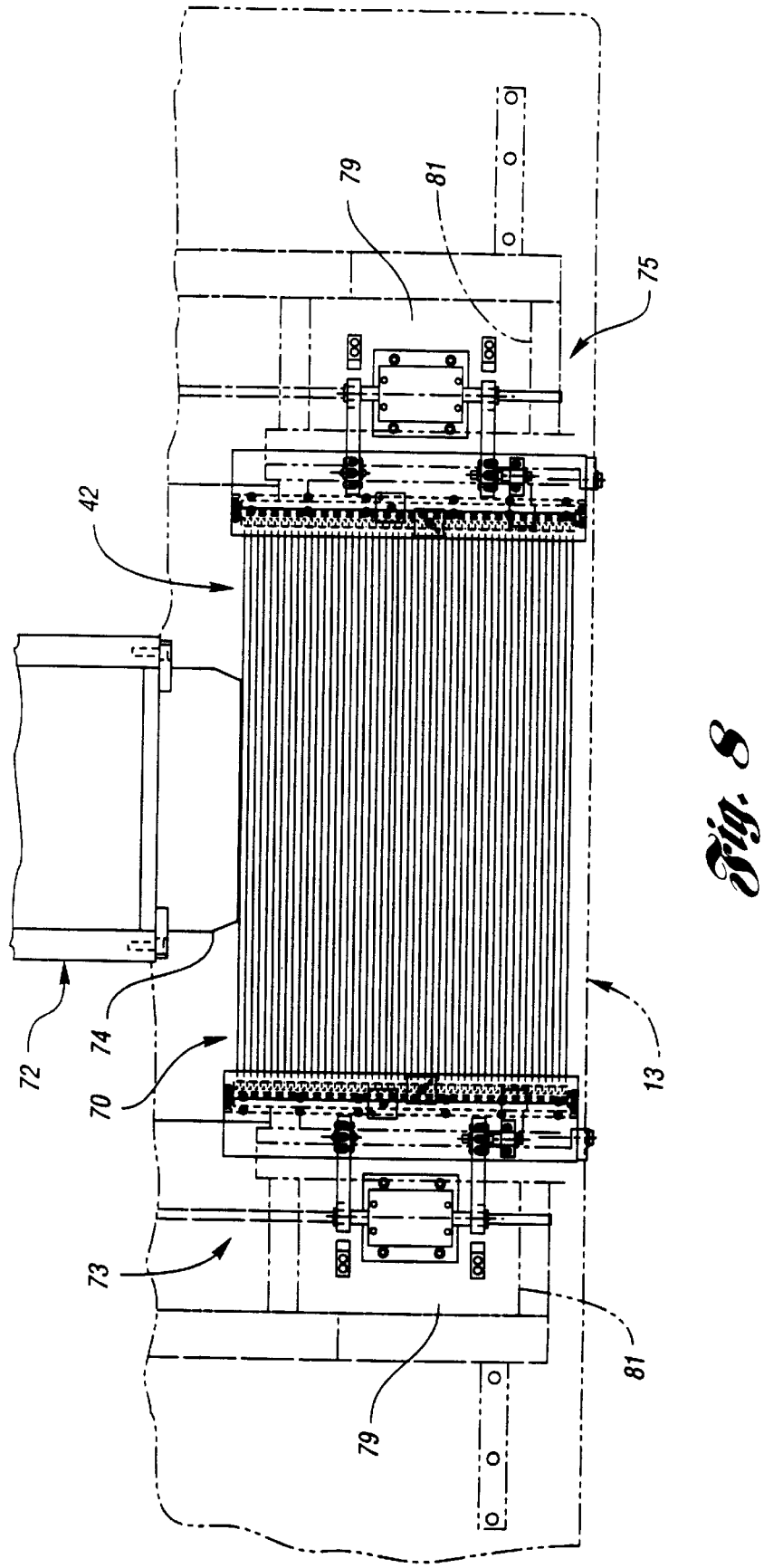
FIG. 8 is a plan view of the core compressor section of the machine, including the core compressor assembly and header attachment mechanism.
Figure 11:
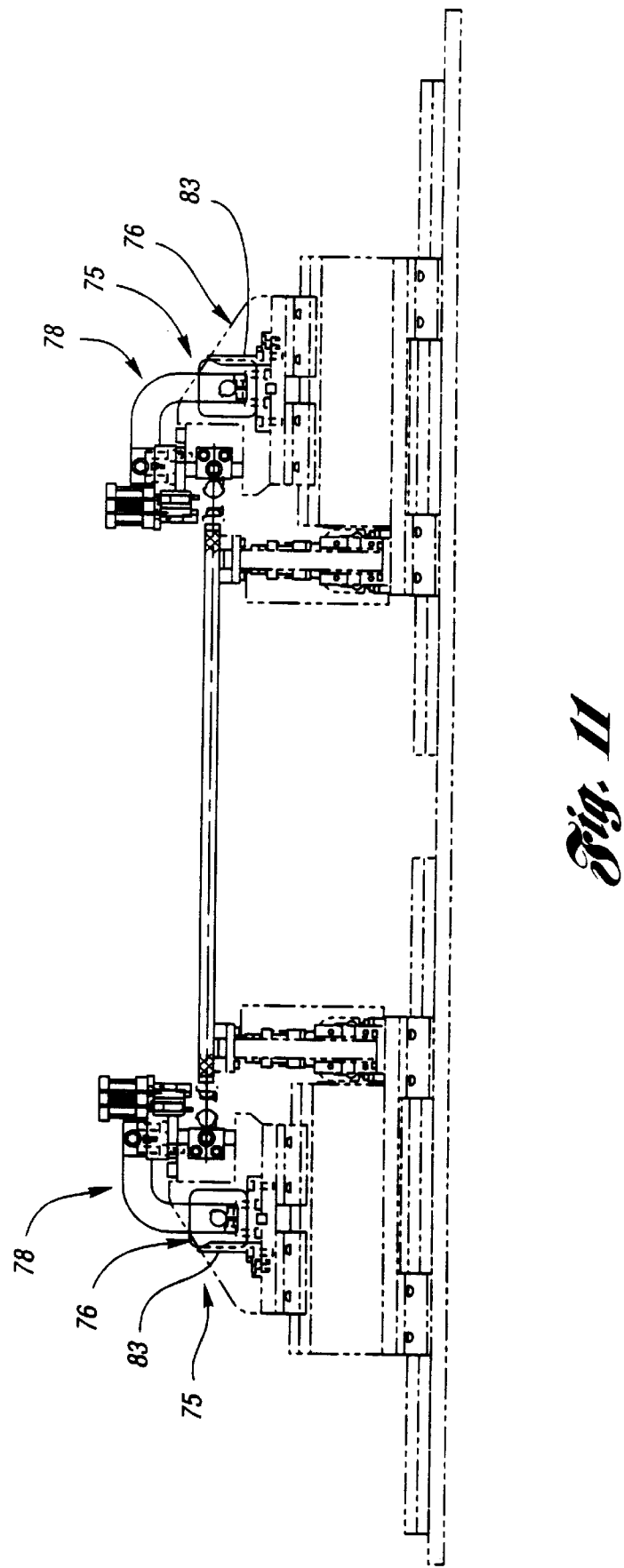
FIG. 11 is an end view of the header attachment mechanisms and the comb and hold down assemblies in accordance with a preferred embodiment of the present invention.

FIGS. 1 through 10 illustrate the various sections of the preferred core builder machine 10. The core builder machine 10 includes an elongated table 12 that extends from the upstream end 11 of the machine to the downstream end 13 of the machine 10 (FIG. 8). Attached to the table 12 at the upstream end 11 of the machine is a tube dispenser assembly 14 (FIG. 3). The tube dispenser assembly 14 holds a tube magazine 16 which accommodates a plurality of tubes 18 and dispenses them one tube at a time.

As shown in FIG. 15, the tube dispenser assembly 14 includes a servo motor 9, a blade 15, and a plate 17. The blade 15 acts as a backstop which successively engages the next tube 18 to be dispensed onto the table 12. The plate 17 reciprocates vertically to dispense the tubes 18 one at a time from the blade 15 and onto the table 12. The servo motor 9 drives an eccentric 19 to cam the plate 17 up and down to dispense the tubes 18. The tubes 18 from the tube magazine are thus dispensed successively onto the table 12 by the tube dispenser assembly 14.

The tubes 18 in the tube magazine 16 are preferably preformed heat exchanger tubes that are manufactured from a 98% pure aluminum alloy. The other 2% of the alloy can be comprised of various other components, including all or some of the following: zinc, magnesium, manganese, titanium, and copper. Examples of preformed tubes are described in assignee's co-pending application Ser. No. 08/822,161, filed Mar. 21, 1997. However, the tubes 18 may be formed in a variety of different shapes and configurations.

Each tube 18 is dispensed onto the table 12 into a tube indexing device 20 (FIG. 3). The tube indexing device 20 is disposed on the machine 10 immediately downstream from the tube dispenser assembly 14. The tube indexing device 20 includes a pair of counter-rotating augers 22, 24 located on each lateral side of the elongated table 12. Each auger 22, 24 has a generally cylindrical portion 28 and a frustoconical portion 30 with each of the frustoconical portions 30 disposed downstream from each of the cylindrical portions 28. The frustoconical portions 30 of each of the augers 22, 24 has an upstream end 32 and a downstream end 34. The frustoconical portions of each of the augers 22, 24 is generally cone-shaped such that the downstream ends 34 have a larger diameter than the upstream end 32 such that the distance between the two opposing downstream ends 34 is shorter then the distance between the two upstream ends 32.

The cylindrical portions 28 and the frustoconical portions 30 each have a helical groove 26 formed in their respective surfaces. The helical grooves 26 begin at the upstream ends of each of the cylindrical and the frustoconical portions 28, 30 of each of the augers 22, 24 and extend downstream while encircling the cylindrical and frustoconical portions 28, 30. Thus, the helical groove 26 that surrounds each of the frustoconical portions 30 of the augers 22, 24 begins at the upstream end 32 and terminates at the downstream end 34. The same applies for the helical grooves 26 that surround the cylindrical portions 28. Each helical groove 26, depending inwardly from the auger surface, has a bottom portion. The distance from each bottom portion of the groove 26 to the axis of rotation of the augers is equal. The helical grooves 26 formed in the cylindrical portions 28 are preferably ⅜ inches deep. The helical grooves 26 formed in the frustoconical portions 30 range from ⅛ inches deep at the upstream end 32 to ⅜ inches deep at the downstream end 34.

The helical grooves 26 are adapted to receive the tubes 18 dispensed from the tube dispenser assembly 14 and transport them downstream. Thus, as the tube dispenser assembly 14 dispenses a tube 18 onto the table 12, it is placed in the next helical groove 26. After a tube 18 is received in the next helical groove 26 on the cylindrical portion 28 of the augers 22, 24, the augers 22, 24 are counter-rotated a single revolution. This moves the tube indexing device 20 forward one position, such that the last tube 18 dispensed onto the table 12 is displaced forwardly over the table 12 by rotational movement of the augers. The rotation is ceased when the next helical groove 26 is adapted to receive another tube 18 from the tube dispenser assembly 14. The augers 22, 24 are also driven by servo motors 29 and only momentarily stop to allow the next tube 18 to be dispensed onto the table 12.

In operation, the first helical groove 26 receives a tube 18 dispensed from the tube dispenser assembly 14. The augers 22, 24 counter-rotate one revolution, such that helical grooves 26 on the opposing augers 22, 24 are adapted to receive another tube 18 from the tube dispenser assembly 14. This process is continued until most, if not all helical grooves 26 of the cylindrical portions 28 of the augers 22, 24 support tubes 18. When the tubes 18 reach the last helical grooves 26 of the cylindrical portions 28 they are rotated into contact with a shoulder portion 31 of each of the augers 22, 24. The shoulder portions 31 contact the tubes 18 for one rotation until the tubes 18 contact the first helical grooves 26 of the frustoconical portions 30 of each of the augers 22, 24. The tubes 18 are transferred downstream in this fashion until they reach the downstream ends 34 of the frustoconical portions 30.

Once the tubes 18 have been indexed and transported to the frustoconical portions 30 of the augers 22, 24, a plurality of serpentine heat exchanger fins 36 are inserted, preferably one at a time between a pair of adjacent heat exchanger tubes 18. Alternatively, multiple fins can be inserted simultaneously. The heat exchanger fins 36 are inserted at each cessation of the servo motor 29 that drives the augers 22, 24 to move the tubes 18 downstream. The fins may be inserted manually, but are preferably inserted by a conveyer 38.

The conveyer 38 is preferably connected to the outlet of a serpentine fin machine for manufacturing the serpentine fins and cutting them to the desired length. An illustrative serpentine fin machine is disclosed in assignee's U.S. patent application Ser. No. 08/644,80, filed May 17, 1996 and entitled "Corrugation Machine and Method for Making a Core for a Heat Exchanger". The fin exits the machine on its face, but must be turned 90° on edge before being inserted onto the table between two preformed tubes. The conveyer 38 that inserts the serpentine fins 36 between a pair of adjacent tubes 18, preferably has a photoelectric eye (not shown) associated therewith. The photoelectric eye is positioned near the exit of the conveyer 38 so that it can detect when a fin is ushered from the conveyer and onto the table 12. The eye sends a signal back to the controller after each fin 36 has been inserted, telling the controller to move the indexing device 20 forward one position, so that another fin 36 can be inserted. The controller can be any conventional controller, such as a PLC.

As the tubes 18 and fins 36 are moved down-stream by the helical grooves 26, the increasing diameter of the downstream portions 34 of the frustoconical portions 30 compresses the fins 36, such that the pitch between each of the peaks in the fins 36 is equal and uniform across the full length of each of the fins 36.

The machine 10 can be programmed to build cores of various sizes. Thus, after the appropriate number of tubes 18 have been placed on the table 12 and the appropriate number of fins 36 have been positioned between those tubes 18, an intermediate assembly 42 of tubes and fins is formed, as is shown in FIG. 2.

A false tube escapement 38 is preferably located above the table 12 (FIG. 3). The false tube escapement 38 inserts a false tube 40 at a position behind where the last serpentine fin 36 in a particular intermediate core assembly will be inserted. For example, if the machine 10 has been programmed to build a core having ten fins, the false tube 40 will be positioned after the tenth fin. The false tube 40 is lowered by the false tube escapement 38 into contact with a helical groove 26 on each of the augers 22, 24, in the same manner as the tube dispenser assembly 14 places the tubes 18 onto the table 12. The location at which the false tube 40 is to be placed is also programmed to be devoid of any tube. Thus, the tube dispenser assembly 14 does not dispose any tubes 18 into that location. The false tube escapement 38 preferably includes a pneumatic cylinder that moves the escapement vertically to place a false tube 40 on the table 12 as required.

The false tube escapement 38 includes a pair of rails 44 (FIG. 3) that allow it to move in a horizontal direction. Thus, when a core has been built and the last fin 36 of a particular core has been inserted between a tube 18 and the false tube 40, the false tube escapement 38 is moved downstream, lowered by the air cylinder, and then activated to retract the false tube 40 before the core is transferred downstream. The false tube escapement 38 then carries the false tube 40 upstream and positions it in the appropriate place in the next intermediate assembly 42 being formed.

Figure 4:
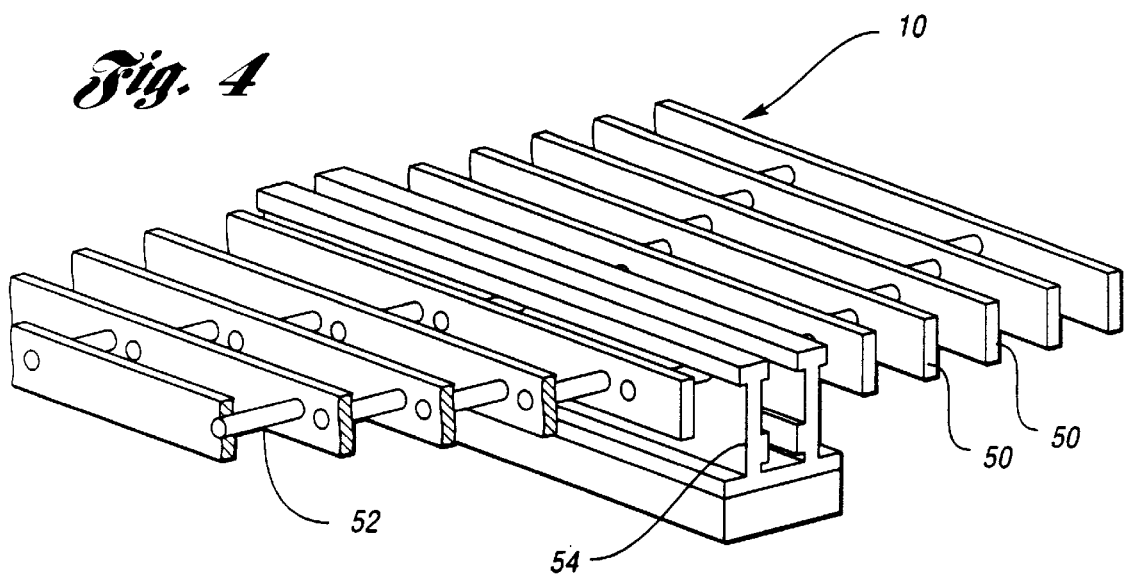
FIG. 4 is a perspective view of a portion of the elongated table of the preferred core building machine in an expanded position for supporting larger core assemblies.
Figure 5:
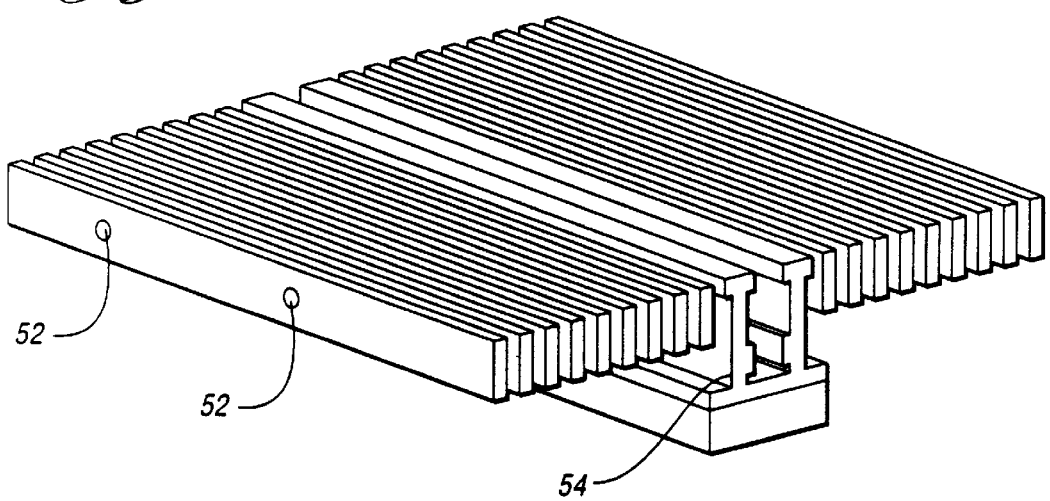
FIG. 5 is a perspective view of a portion of the elongated table of the preferred core building machine in a compressed position for supporting smaller core assemblies.

FIGS. 4 through 6 illustrate the elongated table 12 of the core builder machine 10. The table 12 includes a plurality of slats 50 that extend longitudinally along the length of the machine 10 from the upstream end 11 to the downstream end 13. The slats 50 are connected by a plurality of connecting rods 52 that extend laterally between adjacent slats 50. The slats 50 are supported by a plurality of leg members 54 that support the slats 50. The slats 50 support the heat exchanger tubes 18 and fins 36. The rods 52 are not fixedly attached to the slats 50, but instead telescope within holes formed through the slats. This arrangement allows the slats 50 to be expanded (FIG. 4) and compressed (FIG. 5) to allow the table 12 and thus the machine 10 to handle heat exchanger tubes 18 of various lengths. The right hand side of FIG. 6 illustrates the slats 50 in a compressed configuration, while the left hand side of FIG. 6 illustrates the slats 50 in an expanded configuration.

FIG. 7 illustrates a portion of a transfer assembly that is used to transfer the intermediate assembly 42 from the downstream portion of the indexing section to the core compression section 70 of the machine 10. The transfer assembly preferably includes three slides, a front slide 56 and a pair of rear slides 58. After the intermediate assembly 42 has been assembled as discussed above, the pair of rear slides 58 (FIG. 2) are raised from below the table 12. The front slide 56 and the rear slides 58 contact the front and rear sides, respectively, of the intermediate assembly 42 to keep it intact as it is transferred downstream along the table 12 to the core compression section 70 of the machine 10. More or less slides 56, 58 may be utilized. However, enough slides must be utilized at the rear of the intermediate assembly 42 to keep the assembly 42 from bowing or bending as it is transferred downstream along the table 12.

The paddles 56, 58 travel along rails 60 located below the surface of the table 12. Each of the paddles 56, 58 includes a cylinder 62 that raises and lowers the paddles 56, 58 as required. The rails 60 are located a certain distance below the surface of the table 12 and extend from the tube indexing section 20 to the header attachment section of the table 12. The paddles 56, 58 are connected to a belt 64 and gear 66 which gear is driven by servo motors (not shown). Each of the slides 56, 58 includes a seat portion 68 that contacts the fins and/or tubes of the intermediate assembly 42. In operation, the paddles 56, 58 are raised by their respective cylinders 62 after the requisite number of tubes and fins have been assembled for the programmed heat exchanger core. The seat portions 68 of each of the paddles 56, 58 contact the front and back of the intermediate assembly 42, respectively, and transfers the intermediate assembly 42 to the core compression section 70 at the downstream end 13 of the table 12. The paddles 56, 58 are then lowered by the cylinders 62 and travel on the rails 60 upstream to the tube indexing device 20 to contact another intermediate assembly 42.

As shown in FIG. 8, the core compression section 70 includes a core press 72. After the intermediate assembly 42 reaches the core compression section 70, the paddles 56, 58 are lowered beneath the table surface by their cylinders 62 and travel along their rails 60 upstream to the tube indexing section for transporting another intermediate assembly 42.

Once the paddles 56, 58 are lowered beneath the table 12, the core press 72 is lowered. The core press 72 has an indexing plate 74 that extends generally parallel with the table 12. After the core press 72 is lowered, it is moved forward until the indexing plate 74 contacts the intermediate assembly 42. The indexing plate 74 is then moved forward to compress the tubes and fins until the core is compressed and ready for the header attachment step to be performed. The amount of pressure applied by the core press can be determined by visual inspection, for example, when the top of the fins 36 contact the inner surface of the tubes 18. Alternatively, other mechanism can be utilized to determine the amount the core should be compressed, such as a pressure transducer or a photoelectric eye.

Turning now to FIGS. 9 through 14, the header attachment step is performed by the header attachment mechanism 75 after the core compression step. The header attachment mechanism 75 includes a pair of header presses 76 and a pair of hold down assemblies 78 located on the right and left-hand side of the compressed core respectively. The header attachment mechanism 75 also includes slots in the surface 79 and a rail 81 allowing the mechanism 75 to be adjusted to accommodate various size cores.

After the indexing plate 74 compresses the assembly, the comb and hold down assemblies 78 are rotated from an inoperative position 80, shown in phantom lines in FIG. 12, to an operative position 82 above the compressed core. The rotation of the comb and hold down assemblies 78 are limited by retaining brackets 83.

The comb and hold assemblies 78 (FIGS. 11 and 12) each include a tube align comb 84 and a tube guide 86. After the comb and hold assemblies 78 rotate to the operative position 82, a cylinder 88 is actuated causing the tube align combs 84 to drop. The tube align combs 84 (FIG. 13) have a plurality of grooves 90 for receiving the tubes 18 therein. The grooves 90 are preferably larger than the width of the tubes so that as the comb 84 is lowered it will contact any tubes that might be misaligned. The comb and hold assemblies 78 and the combs 84 are moved inwardly to offset the fins 36 the required amount to facilitate attachment of the headers to the core assembly.

Figure 9:
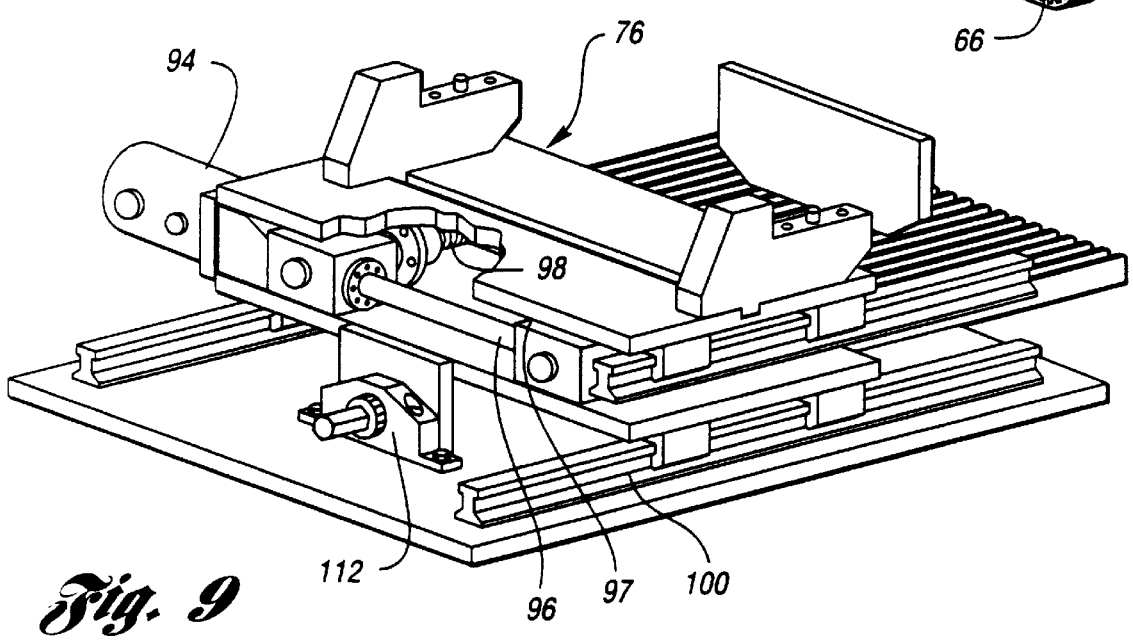
FIG. 9 is a perspective view, partially broken away, of a portion of the header attachment mechanism in accordance with a preferred embodiment of the present invention.
Figure 10:
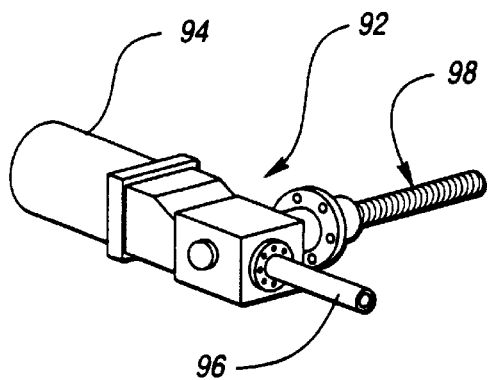
FIG. 10 is a perspective view of the driving mechanism for the header attachment mechanism of FIG. 9.

After the combs 84 (FIG. 13) are dropped and moved inward, the header presses 76 (FIG. 8) are advanced by the header drive mechanism 92, shown in FIG. 9, into position to align the tubes with the respective openings in the headers. The drive mechanism includes a servo motor 94 that drives a first drive mechanism 98. The first drive mechanism 98 is coupled to a second drive mechanism 99 by a shaft 96. The first and second drive mechanisms 98, 99 move the header presses 76 inwardly on a pair of rails 100 toward the compressed core. Stop blocks 112 are located on either side of the header presses 76 to allow the presses 76 to be adjusted to accommodate various sized cores. The headers are preferably loaded into the machine manually by an operator, but may be fed in automatically. Instead of the drive mechanisms 98, 99 being servo driven, they may alternatively be pneumatically or hydraulically driven.

After the core press 72 advances to the predetermined compression for side support to support dimension, the header presses 76 return to their home position. The tube align combs 84 are raised by retracting the cylinders 88. The tube guides 86 (FIG. 14) drop by actuation of the cylinders 88. The tube guide 86 has a plurality of openings 104 that are sized to receive the tubes of the core. The top portions 106 of the openings 104 rest on the top of the tubes 18 to maintain them in position. The header presses 76 are then advanced to press the headers into place on the ends of the tubes. After the headers are attached, the tube guides 102 are then raised by retracting the cylinders 88, the header presses 76 are returned to their home position, and the comb and hold assemblies are rotated to their inoperative positions 80.

A brazed frame can then be placed onto the core either manually or automatically. The core press 72 retracts slightly and raises and then the core press 72 is advanced fully forward. The assembled core can then be removed from the machine either manually or punched out automatically. The cycle is continuously repeated. After the core is removed it can be brazed by control atmosphere brazing or other known brazing methods and the final assembled core 110 will appear such as shown in FIG. 2. Examples of brazing techniques are disclosed in Assignee's co-pending application Ser. No. 08/822,161, filed Mar. 21, 1997, which is hereby incorporated by reference.

Figures 16, 17A:
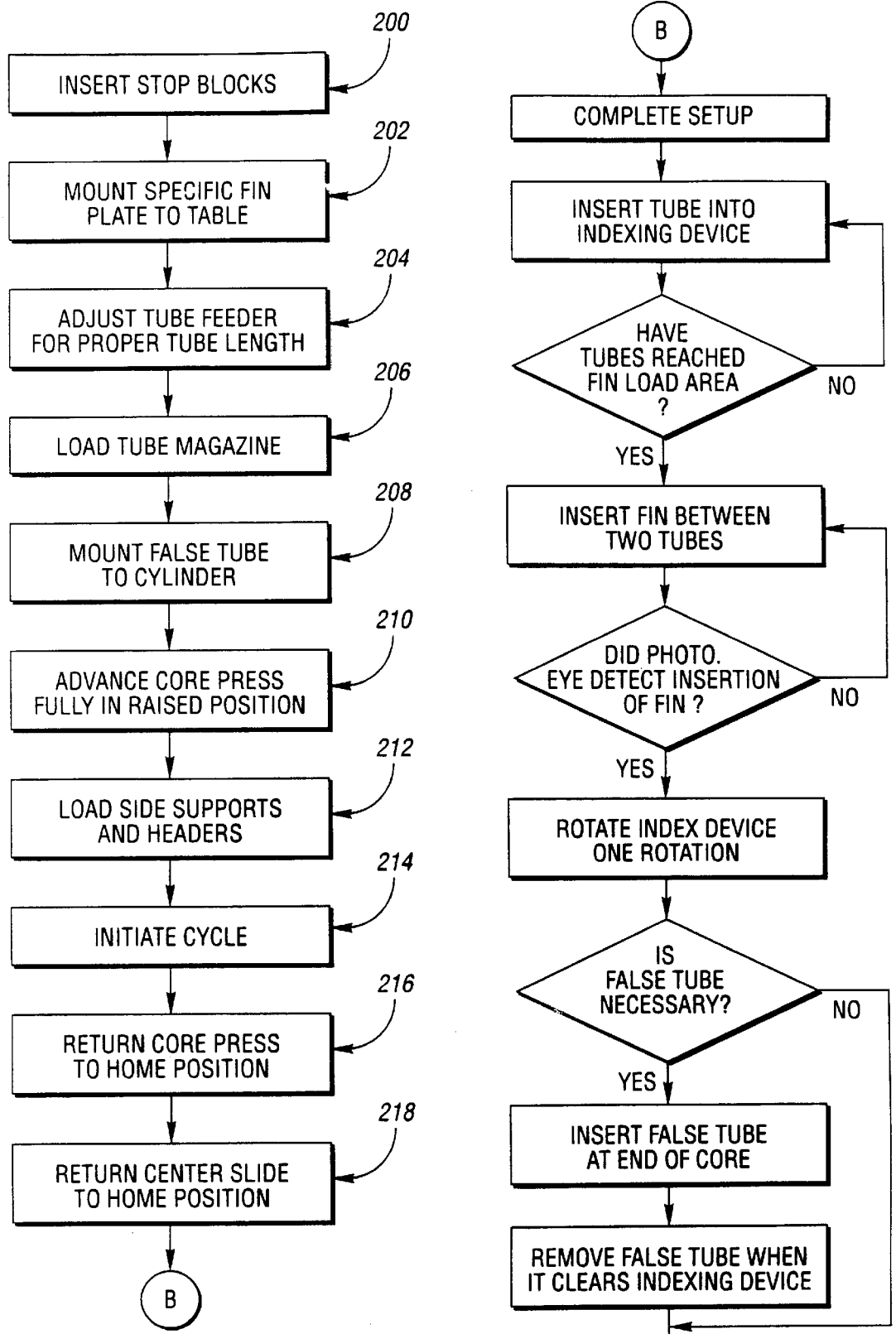
FIG. 16 is a flow diagram illustrating the sequence of set up steps required for operation of the core builder machine in accordance with a preferred embodiment of the present invention.
Figure 17B:
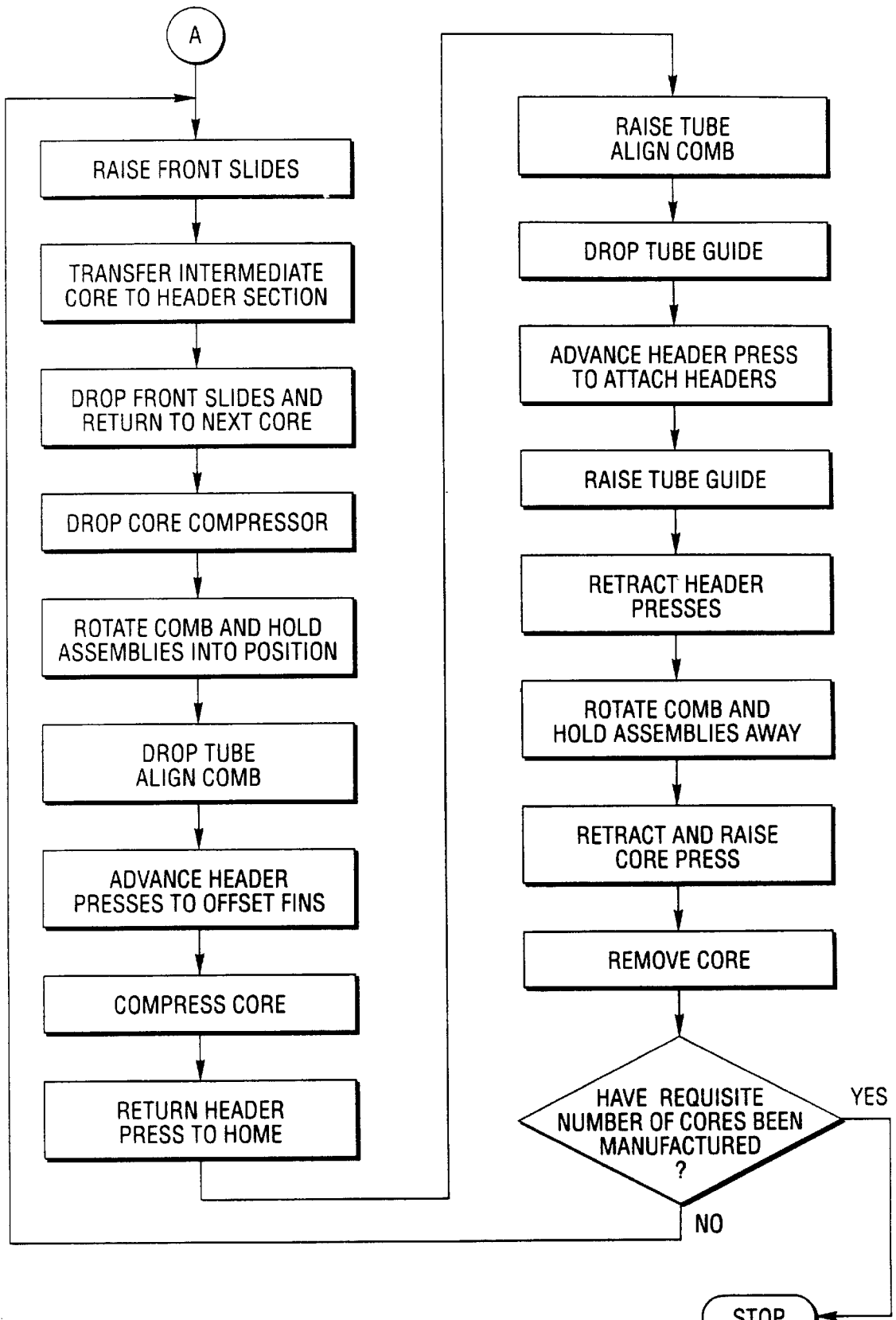
FIGS. 17 *a–b* are flow diagrams illustrating the sequence of operation of the core builder machine in accordance with a preferred embodiment of the present invention.

FIGS. 15 through 16 are flow diagrams illustrating the steps of the core builder process in accordance with the preferred embodiment of the present invention. FIG. 15 illustrates the set up steps that are performed prior to initiating the core building process. The first step is that stop blocks 112 are placed in communication with the table 12 to accommodate the specific width of the core to be produced, as shown at 200. This operation also sets the slats 50 of the expandable table 12 at the appropriate width. Next, a fin plate for the specific core is mounted to the expandable table 12 (202). Then, the tube dispenser assembly 14 is set for the proper tube length (204) as is the tube magazine 16 which is loaded with heat exchanger tubes 18 of the appropriate length (206).

As shown at 208, a false tube of the appropriate length is mounted to the false tube escapement 38. At 210, the core press 72 is fully advanced in its raised position in order to load both side supports. The headers are also loaded to the header attachment mechanism (212). The start button is activated by an operator to begin the cycle, as shown at 214.

At 216, the core press 72 is returned to its home raised position. At 218, the center slide 56 is positioned in its home position at the end of the augers 22, 24.

As shown in FIG. 16, after the machine has been set up and everything is returned to its home position, the tube dispenser assembly 14 dispense tubes and the tube indexing device 20 advances the tubes 18 until the tubes are transferred to the fin load area adjacent to conveyor 38. As shown at 220, after the tubes 18 reach the fin load area, a fin mill begins transferring fins 36 to the conveyor 38 which slides them onto the table 12 between two adjacent tubes 18. A photoelectric eye or other proximity switch detects whether a fin was inserted and then indexes forward one revolution. Additional tubes are dispensed from the tube dispenser assembly 14 and the center slide 56 travels downstream as the core assembly is formed. The false tube 40 is returned to its home raised position with the cylinder retracted and is then inserted at the proper time in the augers 22, 24 to allow a fin 36 to be placed at the rear of the intermediate assembly. The false tube 40 advances with the augers 22, 24. When the false tube 40 is clear or the augers 22, 24 it is replaced by the rear core transfer paddles 58 and the false tube 40 is retracted up by the false tube escapement 38. This cycle repeats continuously.

The intermediate core assembly 42 is then shuttled to the header attachment mechanism. After the intermediate core assembly 42 reaches the header attachment mechanism, the front paddle 56 drops out and returns to the front of the next core being assembled. The indexing plate of the core press 72 is then lowered and the rear paddles 58 drop under the table 12 and are returned to their home position at the end of the augers 22, 24. The comb and hold down assemblies 78 rotate into position. The tube and align comb 86 drops. The header presses 76 advance into position to offset the fins 36 from the ends of the tubes 18. The core press 72 advances to the predetermined compression for side support to side support dimension. The header presses 76 return to the home position. The tube align comb 84 retracts and the tube guide 86 drops. Both sides of the header press 76 advance pressing the headers into place. The tube guide 86 is then raised. The header presses retract to their home position. The operator places the braze frame onto the assembled core. The core press 72 retracts slightly and raises. The core press 72 then advances fully forward and the core is removed. The cycle repeats.

While only one preferred embodiment of the invention has been described hereinabove, those of ordinary skill in the art will recognize that this embodiment may be modified and altered without departing from the central spirit and scope of the invention. Thus, the embodiment described hereinabove is to be considered in all respects as illustrative and not restrictive, the scope of the invention being indicated by the appended claims, rather than by the foregoing descriptions, and all changes which come within the meaning and range of equivalency of the claims are intended to be embraced herein.

What is claimed is:

1. A heat exchanger core assembly mechanism comprising:
    an elongated table;
    a magazine of folded tubes attached to one end of the table;
    a tube indexing device disposed downstream of the magazine, the device receiving and transporting the tubes from the magazine along a predetermined length of the table, the tubes being oriented orthogonally to the length of the table so that the tubes are spaced from each other;

a fin insertion mechanism provided adjacent the table for inserting precut lengths of serpentine fins between adjacent tubes during momentary cessation of the indexing device;

a fin compression device comprising an outer surface of the tube indexing device for compressing the fins, the outer surface serving to distribute the pitch of the fins uniformly between the tubes, thereby centering the fins relative to the tubes to form an intermediate assembly;

a transport mechanism for transporting the intermediate assembly along the table;

a core compressor to which the intermediate assembly is transported, the core compressor being attached to the table downstream from the tube indexing device to compress the intermediate assembly of tubes and fins received from the transport mechanism to form a compressed intermediate assembly; and a header attachment mechanism disposed on opposite sides of the table adjacent to the core compressor, the header attachment mechanism pressing headers onto the ends of the compressed intermediate assembly to form an assembled heat exchanger core.

2. The invention as described in claim 1 wherein the tube indexing device is an auger having a helical groove to receive and transport the tubes from the magazine, the heat exchanger core assembly mechanism being provided with a pair of tube indexing devices located on opposing long sides of the elongated table.

3. The invention as described in claim 2 wherein the tube indexing device includes an escapement for ejecting the tubes from the magazine one at a time into an awaiting groove of each auger.

4. The invention as described in claim 1 wherein the indexing device further includes counter rotating augers, each having a helical groove engaging the ends of the tubes to transport the tubes along the table equally spaced from each other.

5. The invention as described in claim 1 wherein the fin compression device comprises cone-shaped augers with an outside surface which squeezes the fins inwardly in relation to the tubes.

6. The invention as described in claim 1 wherein the core compressor comprises:

a front slide mechanism for limiting the travel of a leading edge of the intermediate assembly of the tubes and fins along the table;

a rear slide mechanism engaging a trailing edge of the intermediate assembly; and a core press for sizing the intermediate assembly against the stop mechanism by forming a predetermined distance between the stop mechanism and the sompress plate to compress the core to a final dimension, thereby forming the compressed intermediate assembly.

7. The invention as described in claim 1, wherein the header attachment mechanism includes a pair of comb and hold down assemblies located on either side of the table.

8. The invention as described in claim 7, wherein the comb and hold down assemblies have an align comb to align the tubes and offset the fins from the ends of the tubes for proper header attachment.

9. The invention as described in claim 7, wherein the comb and hold down assemblies have a guide comb that contacts the top surfaces of the tubes for proper header attachment.

10. A machine for manufacturing a plurality of heat exchanger cores, the machine having an upstream end and a downstream end, comprising:

a tube magazine, including a plurality of tubes attached to said upstream end of said machine;

an elongated table having a surface extending from said upstream end of said machine to said downstream end of said machine;

a tube indexing device disposed at said upstream end of said table for indexing a plurality of heat exchanger tubes;

a tube dispenser assembly for dispensing said plurality of tubes from said tube magazine into said tube indexing device;

a conveyer for inserting a plurality of serpentine fins between adjacent pairs of said heat exchanger tubes;

a controller in communication with said tube dispenser assembly, said tube indexing device, and said conveyer to determine when an intermediate core assembly of the appropriate number of tubes and fins has been formed;

a transfer mechanism for transferring said intermediate core assembly from said tube indexing device to said downstream end of the mechanism; and a header attachment mechanism located at said downstream end of the machine for attaching headers to said intermediate core.

11. The machine of claim 10, wherein said header attachment mechanism further comprises a comb and hold down assembly for aligning and holding said tubes during header attachment and for compressing said fins to the appropriate length.

12. The machine of claim 11, wherein said comb and hold down assembly includes an alignment comb for aligning said tubes for attachment with said headers.

13. The machine of claim 12, wherein said comb and hold down assembly includes a guide comb that holds said tubes down while said headers are being attached to said core.

14. The machine of claim 13, wherein said indexing device includes a pair of counter-rotating augers having an upstream end and a downstream end, each of said augers having a helical groove extending from said upstream end to said downstream end to form a plurality of helical leads for receiving said heat exchanger tubes.

15. The machine of claim 14, wherein said downstream end of said augers has a larger diameter than said upstream end of said augers to compress said serpentine fins.

16. The machine of claim 13, further comprising a fin mill attached to said conveyer for manufacturing a plurality of serpentine heat exchanger fins of the appropriate length and transferring them to said conveyer.

17. The machine of claim 16, wherein said conveyer includes a detection device for determining whether a serpentine fin has been passed from said conveyer to said table, said detection device is in communication with said controller to advance said indexing device forward a position after said detection device determines that a fin has been passed from said conveyer to said table.

18. The machine of claim 17, wherein said detection device is a photoelectric eye.

19. The machine of claim 16, wherein said elongated table includes a plurality of adjustable slats that extend from the upstream end of said table to said downstream end of said table, said slats are adjustable to accommodate heat exchanger tubes of various lengths.

20. The machine of claim 19, further comprising a slide mechanism for transferring said core assembly from said indexing device to said header attachment mechanism.

21. The machine of claim 20, wherein said slide mechanism, further comprises a front slide for contacting the downstream portion of said core assembly and a pair of rear paddles that contact the upstream portion of said core assembly, said front and rear slides contacting said respective portions of said immediate assembly as it is transferred from an upstream portion of the heat exchanger machine to a downstream portion of the machine, comprising:

- a front slide being moveable between a first position below an elongated table of said heat exchanger machine to a second position in contact with a downstream portion of said intermediate heat exchanger assembly;
- a pair of rear paddles being moveable between a first position below said elongated table for contacting an upstream portion of said intermediate heat exchanger assembly; and
- said front paddle and pair of rear paddles each traveling on rails to travel from the upstream portion of the machine to the downstream portion of the machine.

22. The transfer device of claim 21, wherein said paddles are in communication with a belt a pulley system controlled by a servo motor to transfer said front paddle and said rear paddles from said upstream portion of said machine to said downstream portion of said machine.

23. The transfer device of claim 21, wherein said first paddle and said rear paddles each have a cylinder for moving said paddles between said first position and said second position.

24. The transfer device of claim 23, wherein said cylinders are activated by a servo motor in communication with a controller to raise said front paddle and said rear paddles to their respective first positions and to lower said front paddle and said rear paddles to their respective rear positions.

* * * * *